June 19, 1934.  A. E. HUDD  1,963,582
TRAIN CONTROL SYSTEM
Filed March 21, 1932   7 Sheets-Sheet 1
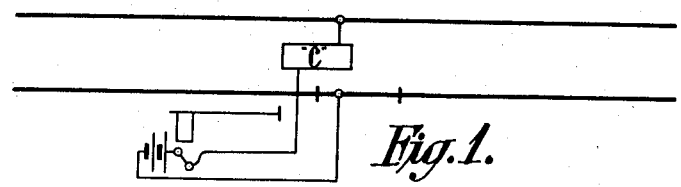
Fig.1.
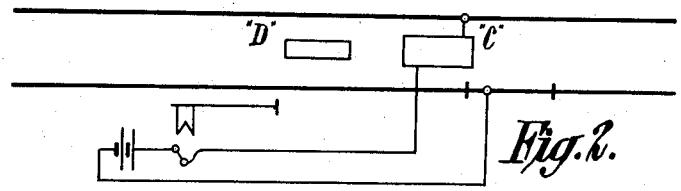
Fig.2.
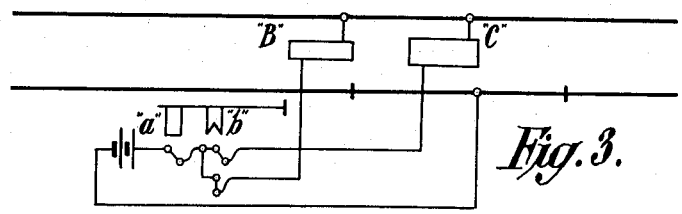
Fig.3.
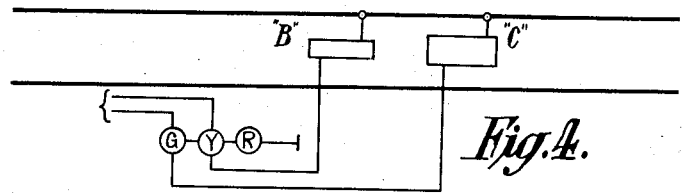
Fig.4.
Fig.5.
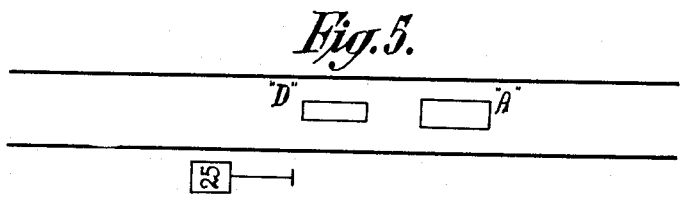
Inventor
Alfred Ernest Hudd
Atty.

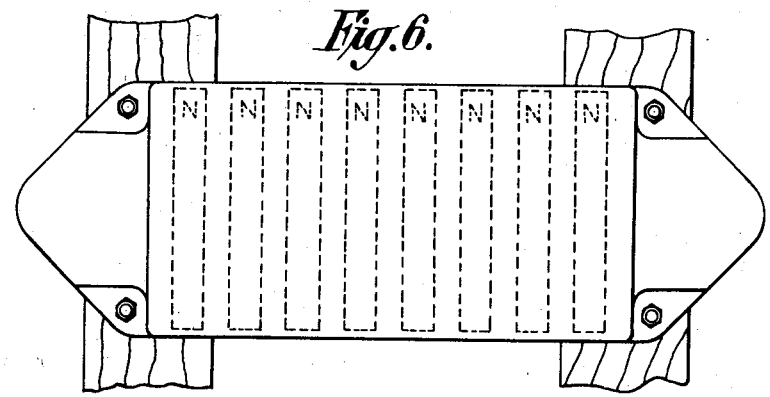
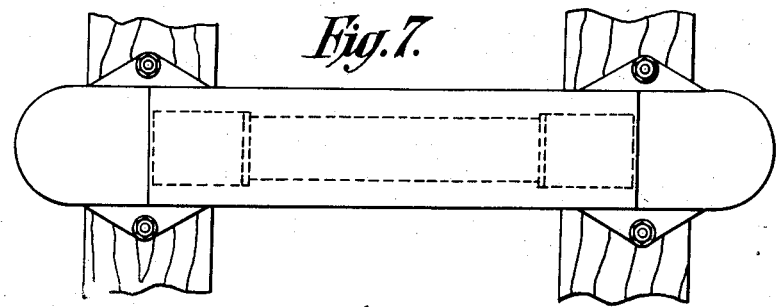
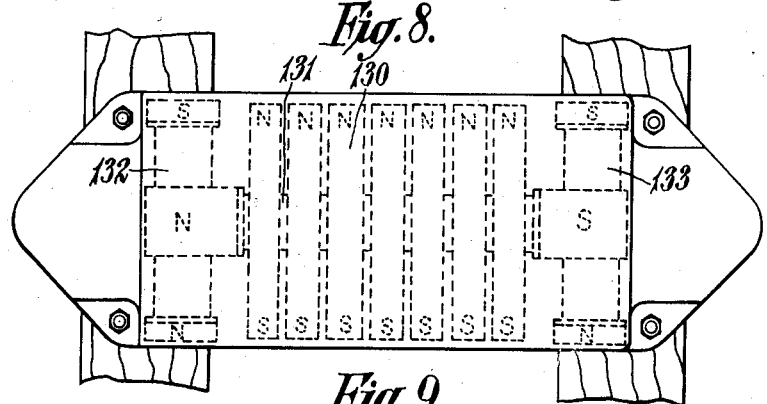
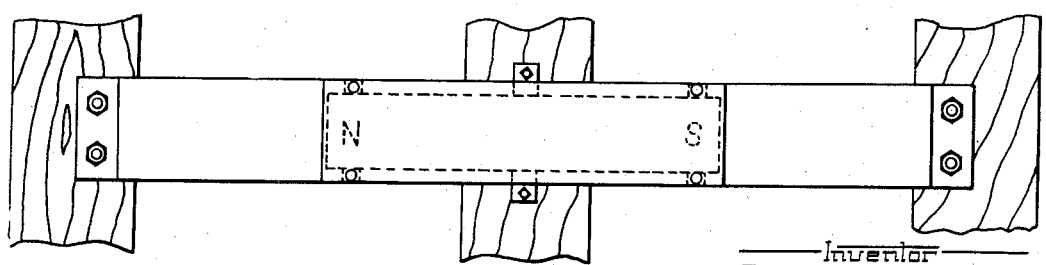

June 19, 1934.  A. E. HUDD  1,963,582
TRAIN CONTROL SYSTEM
Filed March 21, 1932   7 Sheets-Sheet 3

Inventor
Alfred Ernest Hudd

Atty.

June 19, 1934.  A. E. HUDD  1,963,582
TRAIN CONTROL SYSTEM
Filed March 21, 1932  7 Sheets-Sheet 4

Inventor
Alfred Ernest Hudd
Atty.

June 19, 1934.  A. E. HUDD  1,963,582
TRAIN CONTROL SYSTEM
Filed March 21, 1932   7 Sheets-Sheet 5

Inventor
Alfred Ernest Hudd
Atty.

June 19, 1934.　　　　A. E. HUDD　　　　1,963,582

TRAIN CONTROL SYSTEM

Filed March 21, 1932　　　7 Sheets-Sheet 6

Inventor
Alfred Ernest Hudd

Atty.

June 19, 1934.  A. E. HUDD  1,963,582
TRAIN CONTROL SYSTEM
Filed March 21, 1932   7 Sheets-Sheet 7

Inventor
Alfred Ernest Hudd
Wm Walter Owen. Atty.

Patented June 19, 1934

1,963,582

UNITED STATES PATENT OFFICE 1,963,582

TRAIN CONTROL SYSTEM

Alfred Ernest Hudd, Chicago, Ill., assignor to Associated Electric Laboratories Inc., Chicago, Ill., a corporation of Delaware Application March 21, 1932, Serial No. 600,207
In Great Britain April 22, 1931

5 Claims. (Cl. 246—63)

The present invention relates in general to improvements in or relating to train control and/or cab signalling systems.

One of the objects of the invention is to provide an arrangement whereby the resetting plunger can only become effective to stop the sounding of the alarm signal and the application of the brakes when the speed of the train has been reduced to a predetermined value while a further object of the invention is to provide modified trackway and receiver elements which are arranged to increase the time during which the receiver is under the influence of a trackway element and are therefore particularly suitable in locations where the trains travel at high speeds and hence the receivers are positioned over the trackway elements for a very short interval of time only.

A still further object of the invention is to provide a single valve structure rugged in construction which is capable of causing different signals in the cab of the locomotive to be operated and different degrees of brake application to be made dependent upon the type of wayside signal or track apparatus which is encountered.

According to one feature of the invention an arrangement for indicating a particular angular velocity of a rotating device comprises a pivoted member adapted to be rotated about the pivot to open or close a valve only when a particular angular velocity is reached.

According to a further feature of the invention apparatus for use on the track in a train control and/or cab signalling system comprises one or more permanent magnets having one or more electromagnets arranged crosswise with respect thereto, the pole pieces of the electromagnets being located in such a position that they are adjacent to and capable of neutralizing the effect of poles of the permanent magnets.

According to a still further feature of the invention in a train control and/or cab signalling system a valve located on the locomotive is adapted when operated by magnets located along the track to effect the operation of a second valve, this second valve causing a brake application and a distinctive signal to be given only if the first valve is restored automatically by further magnets located along the track.

The invention will be better understood from the following description of one method of carrying it into effect which should be taken in conjunction with the accompanying drawings:—

Referring now to the drawings:

Fig. 1 shows the track apparatus located at a home signal.

Fig. 2 shows the track apparatus located at a distant signal.

Fig. 3 shows the track apparatus located at a combined home and distant signal.

Fig. 4 shows the track apparatus located at a three-aspect colour light signal equivalent to the combined home and distant signal shown in Fig. 3.

Fig. 5 shows the track apparatus located at points where a "location effect" is permanently operative to give warning to the driver of a curve, steep incline or the like.

Fig. 6 shows a permanent magnet assembly employed for opening a slide valve such as disclosed in U. S. Patent No. 1,910,437, issued May 23, 1933, and causing a signal and/or brake application to occur on the train.

Fig. 7 shows an electromagnet employed for automatically closing the slide valve when energized.

Fig. 8 shows an assembly consisting of a combination of permanent and electromagnets which is effective to control the slide valve if the electromagnets are de-energized but exerts no effect on the slide valve if the electromagnets are energized.

Fig. 9 shows a permanent magnet of dimensions similar to the electromagnet shown in Fig. 7 and employed in place thereof at points where it is desirous of having a continuously operative effect.

Figure 10:
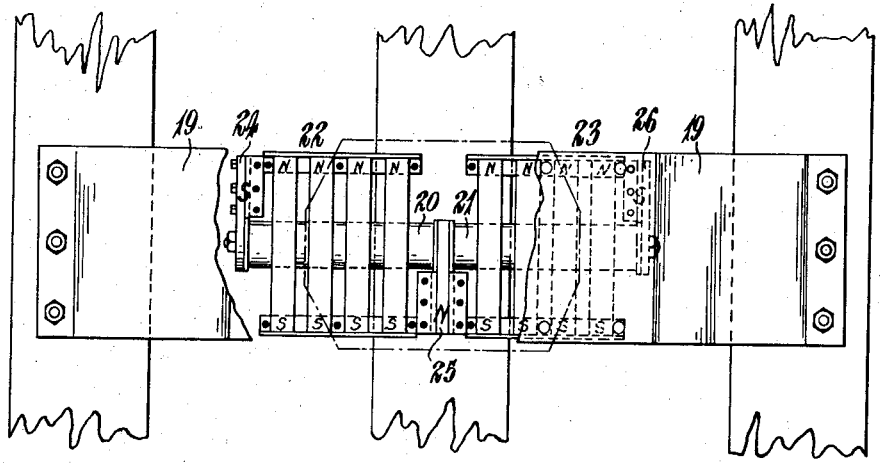

Fig. 10 shows a plan view of track apparatus located at a home signal which performs a function similar to the function of the track apparatus shown in Figs. 1 and 8.

Figure 11:
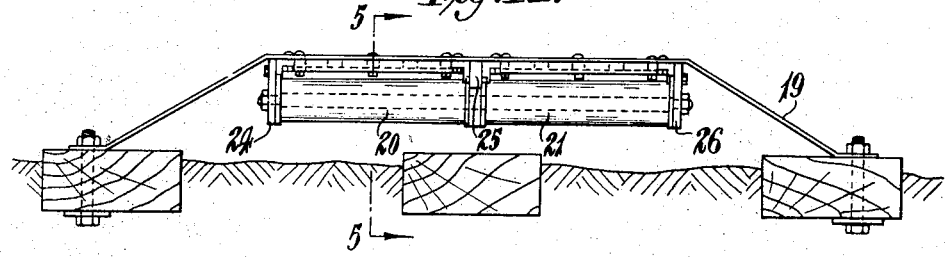

Fig. 11 shows the track apparatus of Fig. 10 in side elevation.

Figure 12:
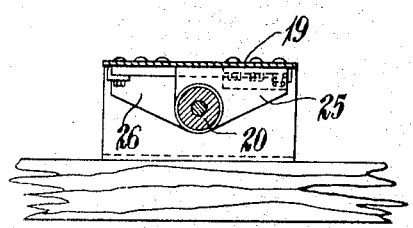

Fig. 12 shows a section on the line 5—5 of Fig. 11.

Figure 13:
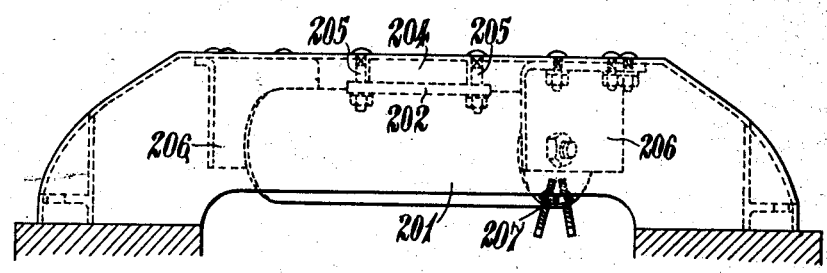

Fig. 13 shows a plan view of a trackway element located at a home signal and arranged to perform a function similar to the function of the trackway elements disclosed in Figs. 1, 8, 10, 11 and 12.

Figure 14:
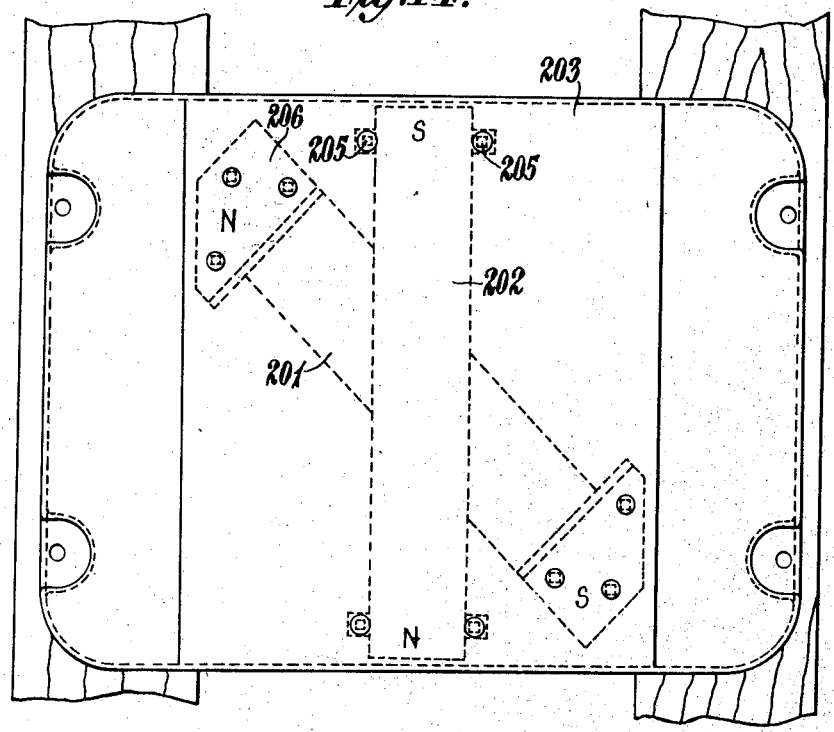

Fig. 14 shows the track apparatus of Fig. 13 in side elevation.

Figure 15:
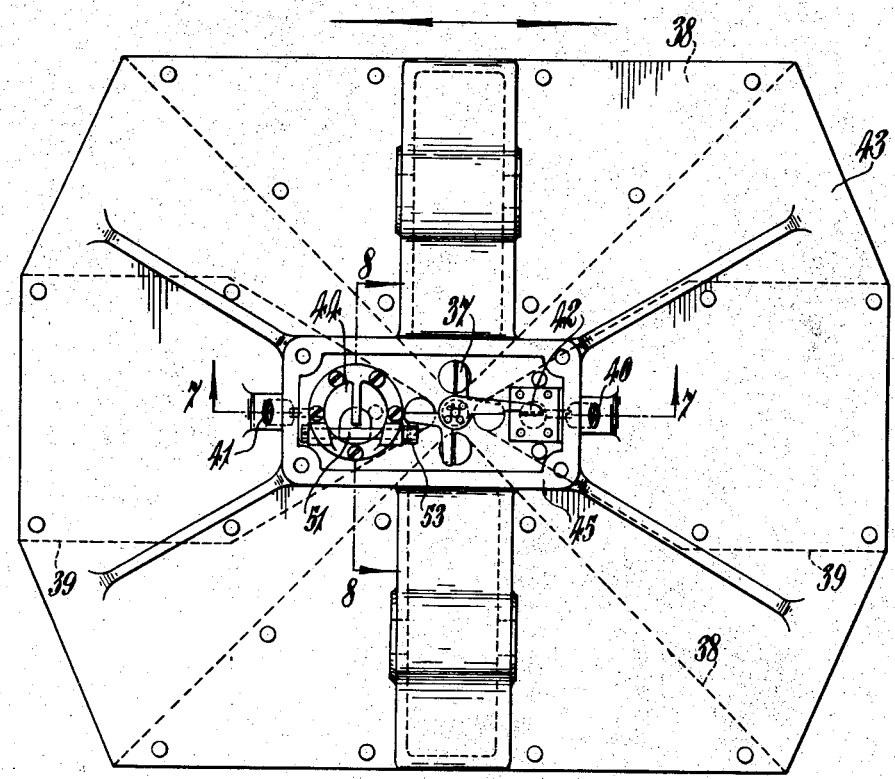

Fig. 15 shows a plan view of the receiver relay which is operated by the various trackway elements.

Figure 16:
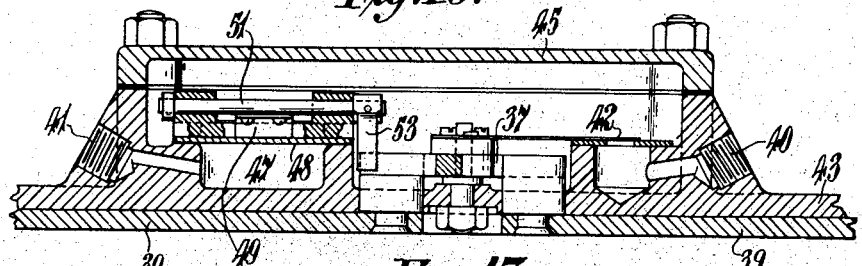

Fig. 16 shows a section on the line 7—7 of Fig. 15.

Figure 17:
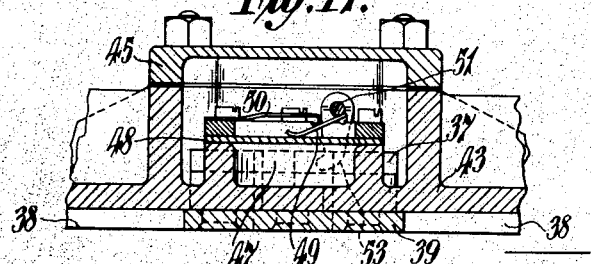

Fig. 17 shows a section on the line 8—8 of Fig. 15.

Figure 18:
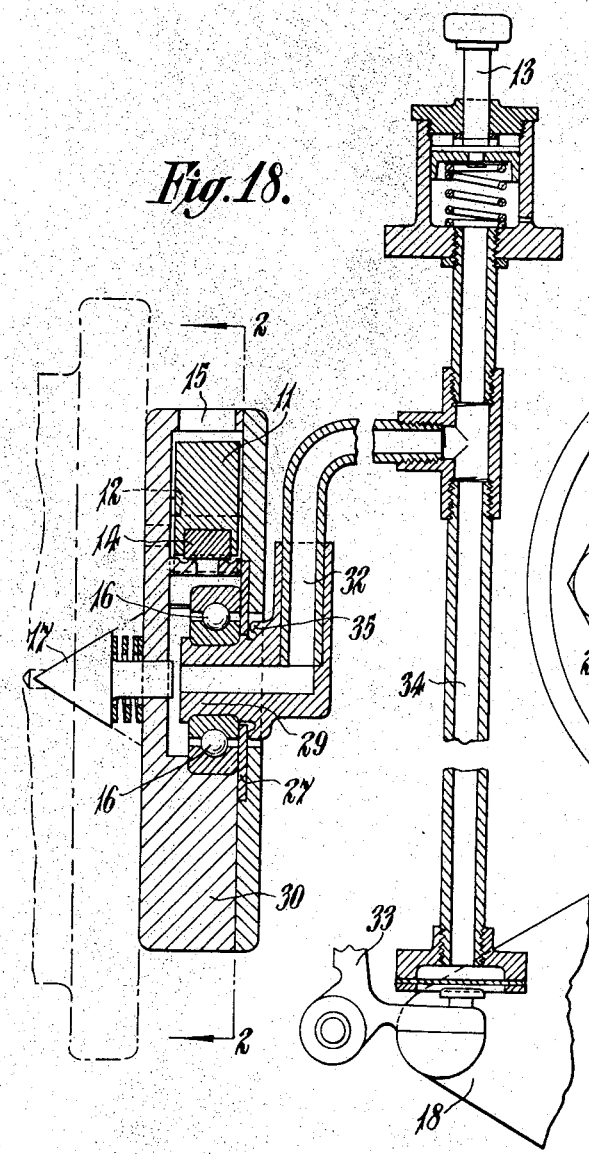

Fig. 18 shows speed controlled mechanism attached to an axle of the locomotive and having connection with the driver's acknowledging plunger.

Figure 19:
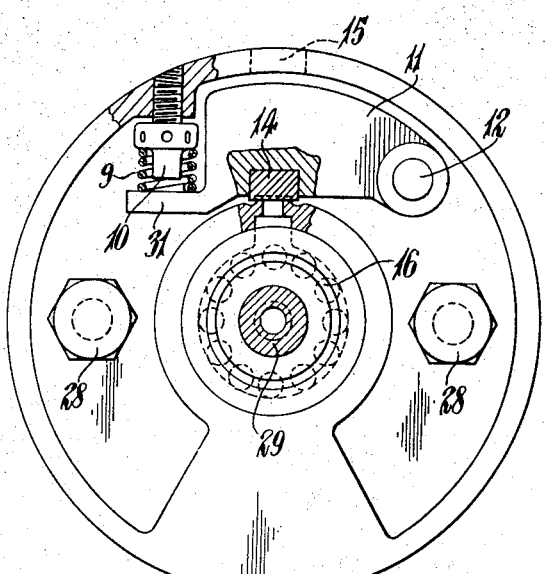

Fig. 19 shows a section on the line 2—2 of Fig. 18.

Figure 20:
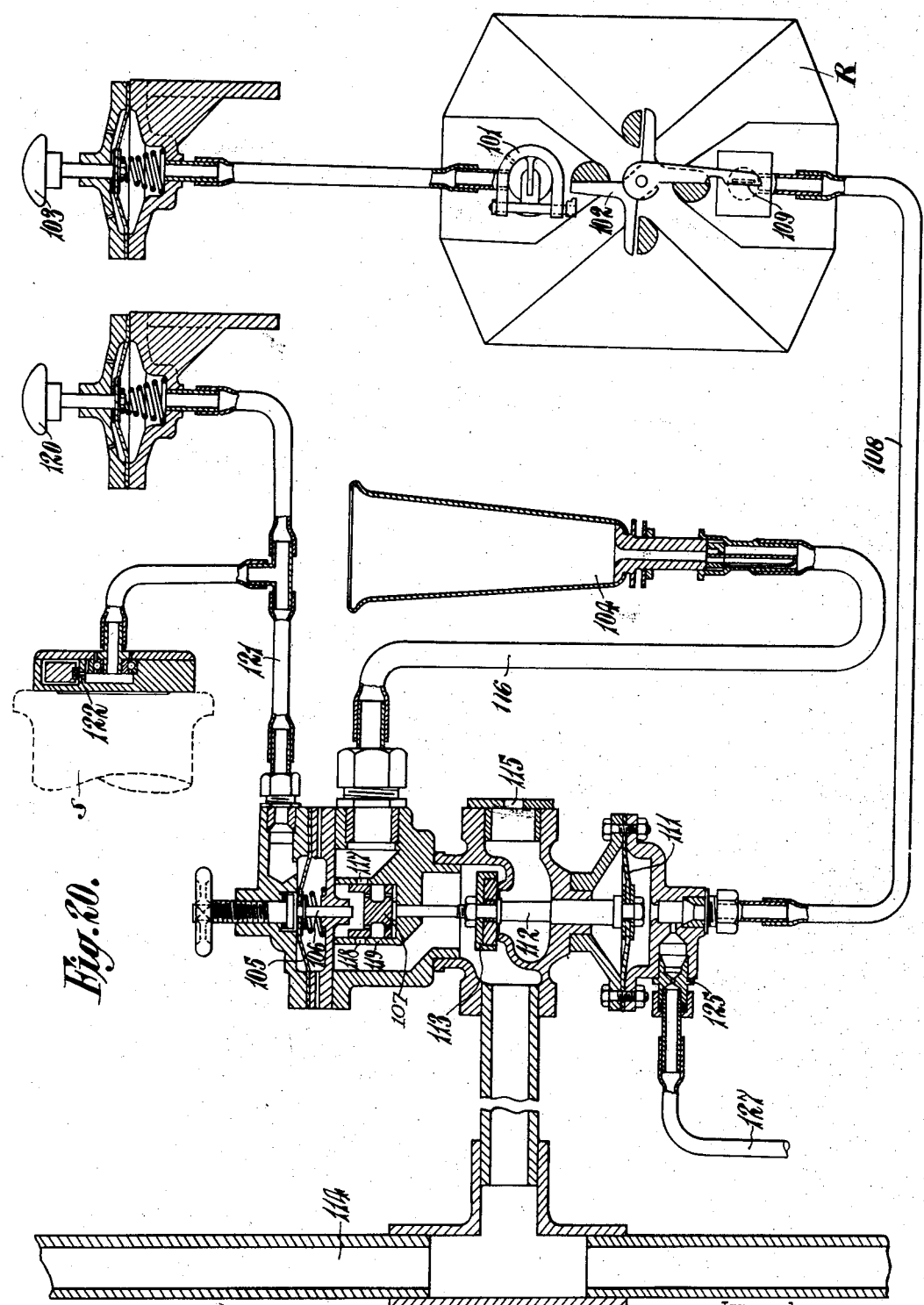

Fig. 20 shows the apparatus carried by the locomotive which is operated in accordance with the various influences received from the track and is arranged to control the brakes and the signalling devices located in the cab.

A description will first of all be given of the track devices shown in Figs. 1 to 9.

The track device C shown in Fig. 1 is identical with the track device C illustrated in greater detail in Fig. 8 and consists of a number of permanent magnets 130 arranged transversely across the track and three electromagnets 131, 132, 133 two of which are also located transversely across the track, while the third (131) is located parallel to the track and centrally between the rails.

The two transverse electromagnets 132, 133 are situated one at each end of the row of permanent magnets and are arranged when energized to neutralize to a certain extent the magnetic field set up by the permanent magnets at the ends of the row. By this means the longitudinal electromagnet which exerts a holding effect on the armature of the receiver relay carried by the locomotive can be effective to perform its function, although the magnetic field set up thereby is weaker than would be the case if the transverse electromagnets were not employed.

The current necessary for the longitudinal holding electromagnet is not so great as the current necessary for the transverse neutralizing electromagnets and as it is desirable to use the same current supply for all three electromagnets, magnets consisting of a special combination of a permanent magnet and an electromagnet can be employed for the transverse neutralizing electromagnet as these combination magnets require less current. The combined magnet will consist of a permanent bar magnet forming one side of a rectangular frame and an electromagnet forming a further side of the rectangular frame, the whole frame being made of magnetic material. When the electromagnet is de-energized the permanent magnet will lie in a closed magnetic circuit and will set up no external field but when the electromagnet is energized the two magnets will combine to set up an external magnetic field comparable in strength to the sum of the normal external field strength of each.

If the home signal is at "clear" the electromagnet will be energized and the device C will, therefore, have no effect on the receiver relay carried by the locomotive but if this signal is at "danger" the electromagnet will be de-energized and the permanent magnets will be effective to operate the armature as will be described later.

The two track devices shown in Fig. 2 which are located at a distant signal comprise the permanent magnet D shown in Fig. 9 and the device C already described. If the distant signal is at "clear" the electromagnets contained in the device C will be energized and this device will be without effect. Similarly the device D will be without effect as its function is purely that of holding the armature in the receiver relay in an unoperated position. If, however, the distant signal is at "danger", the electromagnets contained in the device C will be de-energized and the permanent magnets contained therein will be effective to operate the armature which will be subsequently reset by the permanent magnet D.

The track devices shown in Fig. 3 which are employed at a combined home and distant signal consist of an electromagnet B such as shown in Fig. 7 and a device C. If both home and distant signals are at "clear", the electromagnets contained in the device C will be energized and this device will, therefore, have no effect on the armature of the receiver relay. The electromagnet B will be ineffective whether energized or de-energized owing to the fact that it is used solely to restore the armature after it has been operated. If the home signal is at "clear" and the distant signal is at "danger", the electromagnets in the device C will be de-energized and the electromagnet B will be energized. If, however, both the distant and home signals are at "danger" both the electromagnets contained in the device C and the electromagnet B will be de-energized. This will cause a different effect on the locomotive to that which occurs when the home signal is at "clear" and the distant signal is at "danger".

The track devices shown in Fig. 4 are the same as those shown in Fig. 3, and their circuits are completed through lamp signals located on the track. If the green signal G is lighted the devices B and C will have no effect on the locomotive while if the yellow lamp Y is lighted, the effect will be the same as exists at a combined home and distant signal when the distant signal is at "danger" and the home signal is at "clear". If the red lamp R is lighted or if no lamps are lighted the effect equivalent to both home and distant signals at "danger" will be obtained.

Referring now to Fig. 5, the track devices shown in this figure consist of a permanent magnet such as shown in Fig. 9 and a set of permanent magnets A such as shown in Fig. 6. This apparatus is used at points where it is desirous to give a warning to the driver that he must be cautious owing to the presence of a curve, steep incline or the like which will be dangerous if taken at too high a speed. Both the devices consist of permanent magnets and the control exerted thereby on the locomotive is operated at all times.

Referring now to Figs. 10, 11 and 12 these show a trackway magnet assembly which is located in the vicinity of a home signal and can in special conditions also be located in the vicinity of a distant signal.

This trackway magnet assembly has exactly the same effect on the receiver relay carried by the train as the home signal trackway element already described. The assembly comprises two sets 22 and 23 of permanent magnets which are arranged transversely across the track and two electromagnets 20 and 21 which are mounted parallel to the track end to end in such a position that they lie centrally between the poles of the permanent magnets and have an intermediate common pole piece 25 located between the two separate sets of permanent magnets. The permanent magnets and electromagnets are mounted on the underside of a cover 19 which may be conveniently made of manganese steel and which is secured to the sleepers by bolts in the usual manner.

The pole pieces of the electromagnets extend at right angles to the axis of the coils, the two pole pieces for each electromagnet being located on opposite sides of the axis. Only three pole pieces, however, are provided as both electromagnets energize a common pole piece located to the side of the position where the two electromagnet cores adjoin. The electromagnets when energized are arranged to induce magnetism of such polarity in their pole pieces that they will neutralize the effect of the permanent magnet poles adjacent to which they are located. For instance in Fig. 10 the end pole pieces 24 and 26 of the electromagnets are shown having south polarity while the permanent magnet poles to which they are adjacent have north polarity. Similarly the intermediate pole 25 which is located between permanent magnet poles having south polarity is indicated as having north polarity.

Referring now to Figs. 13 and 14 these show a still further modification of the trackway element located at a home signal and a description of this trackway element will now be given.

The trackway element operates in substantially the same way as that disclosed in Fig. 10, the arrangement of the poles of the electromagnet in an unsymmetrical manner having the effect of preventing the permanent magnet from operating the receiver armature before the full effect of the electromagnet can become operative to hold the armature in its non-operating position. This will be more readily apparent from the description which will follow later.

The cover plate 203, which carries the electromagnet 201 and the permanent magnet 202 on its underside, is mounted on adjacent sleepers by means of bolts which pass through suitable holes in the cover plate. The permanent magnet is secured to the underside of the cover plate by bolts 205, a spacing block 204 being introduced between the cover and the magnet to prevent them coming into contact. The electromagnet is bolted to angle pieces 206 which are in turn bolted to the cover plate in such a position that the electromagnet is located immediately below the permanent magnet and at an angle of about 45° thereto. The electrical connections to the electromagnet are made at the point 207. The electromagnet when energized imparts to its pole pieces the polarity shown in Fig. 14. Hence when energized it will tend to neutralize the field set up by the permanent magnet and thus prevent the armature of the receiver relay on the train from being operated.

A description will now be given of the receiver relay which is influenced by the various magnet assemblies located along the track.

In the previously mentioned patent, the permanent magnets are located parallel to the track and the electromagnets are at right angles thereto. It will be noted, however, from the various trackway elements already described that in the present invention this arrangement is reversed, the electromagnets being arranged parallel to the track and the permanent magnets transversely across the track.

The receiver relay shown in Fig. 15 is therefore set at an angle of 90° with respect to the setting of the receivers shown in the above mentioned patent in order that the permanent and electro magnets may have the same effect as before. The armature 37, slide valve 42 and resetting device 44 are located within a housing 43 which is provided with a dust proof cover 45. The slide valve is of the same construction as described in the previously mentioned patent and connects with a pipe leading to the brake controlling valve at the point 40.

The resetting device is, however, of a construction different from that proposed in said prior patent and will, therefore, be described in greater detail. The plunger 103 in the cab of the locomotive connects by means of a pipe with the port 41 as shown in Fig. 20 which in turn connects with a chamber 47 which is closed on one side by a diaphragm 48. A lever member 49 is held against the centre of the diaphragm by means of the spring 50 and is rigidly coupled to a rod 51 which carries an extension 53 at one end.

When the plunger 103 is depressed the pressure in the chamber 47 increases, and the diaphragm 48 is forced upward. The movement of the diaphragm causes the movement of the lever 49 which is maintained in engagement therewith and this in turn causes the rotation of the rod 51 and the extension 53. The extension 53 on rotating engages the armature 37 and restores it to its normal position.

A description will now be given of the manner in which the receiver relay is controlled when it passes over the magnet assembly shown in Fig. 10.

If the signal associated with the magnet assembly is at "danger" the electromagnets 20 and 21 will be de-energized and the permanent magnets 22 and 23 will influence the collecting plates 38 so that the armature 37 is operated and the slide valve is opened. The driver can now reset the armature in the manner described (only however if the speed of the train is below a limiting value as will be apparent later).

If, however, the signal associated with the magnet assembly is at "clear" the magnets 20 and 21 are energized and the pole pieces 24 and 26 become of south polarity while the pole piece 25 becomes of north polarity. When the receiver commences to pass over the assembly and assuming that the receiver shown in Fig. 15 approaches the assembly from the left, the right-hand collecting plate 39 will be the first to pick up flux. There will be no effect, however, on the armature as it is already engaging the pole pieces of the plates 39. After this the upper collecting plate 38 will pass over the pole piece 24 which is neutralizing the north poles of the permanent magnets. If the pole piece 24 is stronger than the permanent magnet poles or vice versa, the upper collecting plate 38 will pick up flux but owing to the position of the armature against the pole pieces of the collecting plates 39 it will have no effect on the armature. As the receiver moves further over the magnet assembly, it will come into the full holding field generated by the electromagnet 20 and the armature will be held in the position shown in Fig. 15 against the pull of the pole pieces of the collecting plates 38. The effect will be similar when the receiver moves away from the influence of the electromagnet 20 into the influence of the electromagnet 21 and also when the receiver finally moves away from the influence of the assembly as a whole. It will be realized, therefore, that when the electromagnets 20 and 21 are energized they will be effective to maintain the armature in its non-operating position against the influence of the permanent magnets. If desired further permanent and electro magnets can be added to increase the length of the assembly which can therefore be made of appropriate length to ensure that the armature is controlled correctly at the maximum speed of the train.

It will be understood that the trackway element disclosed in Figs. 13 and 14 controls the receiver relay in substantially the same manner as described as the poles of the electromagnet occupy practically the same positions with respect to the permanent magnet poles as do the poles of the electromagnet shown in Fig. 10.

The manner in which the trackway element disclosed in Figs. 1 and 8 controls the receiver relay under "danger" conditions will be exactly the same as that already described with reference to Fig. 10. When the element indicates "clear" the electromagnets 132 and 133 will be effective to neutralize the effect of the end permanent magnets and thus allow the collecting plates 39 to get completely into the holding field generated by electromagnet 131 before the permanent magnets 130 can energize the collecting plates 38 sufficient to operate the armature 37.

A description will now be given of the speed control mechanism illustrated in Figs. 18 and 19.

The mechanism which rotates on an axle of the locomotive is secured thereto by means of bolts 28 and is positioned centrally with respect to the axle by means of the centering device 17. The non-rotating portion of the mechanism comprises an axle 29 on which the rotated portion is pivoted by means of the ball race 16. A member 11 pivoted on the rotating cylinder 30 at the point 12 is arranged to control a valve 14. This member 11 is normally maintained in the position shown in Fig. 19 by means of the coiled spring 9 but when the angular velocity of the axle exceeds a predetermined value (for instance equivalent to a train speed of 20 miles an hour), the member 11 will move outwards under the action of centrifugal force until its extension 31 comes up against the stop 10. In this position the valve 14 is opened and air can escape from the pipe 32 through the valve to atmosphere at the port 15. A flexible washer 27, for instance, made of leather, is secured to the rotating portion of the mechanism and is arranged to press against a ridge 35 on the stationary portion of the mechanism and make an air tight joint when the air valve 14 is closed.

In Fig. 18 a reset plunger 13 and part of a receiver relay (33, 18) are shown and these correspond to the reset plunger and corresponding part of the receiver relay shown in Fig. 20.

The operation of the speed control device is as follows: When the armature 33 is operated from the position shown in Fig. 18 by magnets located along the track, the driver can reset the armature by operating the reset plunger 13. The operation of the reset plunger causes an increase of pressure in the pipes 32 and 34 and if the valve 14 is closed, the armature 33 can be restored for, as previously described, the washer 27 will be forced against the circular ridge 35 on the stationary portion of the mechanism and will form an air tight joint. If, however, the speed of the locomotive is such that the angular velocity of the axle is sufficient to cause the member 11 to move outwards, the valve 14 will be opened and when the driver depresses his reset plunger air will escape from the pipe 32 through the valve 14 and the port 15 so that it will be impossible to effect the restoration of the armature. It will be realized, therefore, that before the reset plunger can become effective to restore the armature 33 the speed of the locomotive must be below the critical speed at which the member 11 moves outward under the influence of centrifugal force and opens the valve 14.

A description will now be given of the manner in which the brakes and the signals in the cab of the locomotive are controlled by the trackway elements, receiver relay and speed controlled mechanism which have already been described, reference being had for this purpose to Fig. 20.

Referring now to this figure the receiver relay R corresponds to the receiver relay shown in Figs. 15, 16 and 17 while the speed controlled mechanism S corresponds to that shown in Figs. 18 and 19.

The operation of the train control apparatus is as follows:—

When the locomotive passes a distant signal such as shown in Fig. 2 and this signal is at "clear" there will be, as already described, no effect on the receiver R. If, however, this signal is at "danger" the armature 102 will be operated when the receiver R passes over the device C and the pipe 108 will be connected to atmosphere at the slide valve 109. The chamber below the diaphragm 111 which is normally exhausted through the restricted orifice 125 is now connected to atmosphere and the diaphragm 111, therefore, operates to move the lift valve spindle 112 in an upward direction. The lift valve spindle 112 carries with it the padded valve washer 113 and the valve 107. The movement of the valve washer 113 connects the train pipe 114 to atmosphere via the port 115 so that a full brake application tends to occur, but as the armature 102 is restored almost immediately by the permanent magnet D a full brake application will not occur. The movement of the valve 107 connects the hooter 104 via the pipe 116 and the ports 117 and 118 to the train pipe and consequently the hooter sounds and air passes into the train pipe 114. As already mentioned, the armature 102 is almost immediately restored by the permanent magnet D and this results in the restoration of the diaphragm 111 and the lift valve 113 and the closing of the direct connection between the train pipe 114 and atmosphere via the port 115. The restoration of the lift valve 112, however, does not restore the valve 107 as this is not joined thereto and, moreover, the suction through the port 118 is sufficient to maintain the valve 107 in contact with the wall 119 and prevent it from returning to its unoperated position. The hooter, therefore, continues to sound and the brakes continue to be partially applied owing to the connection of the train pipe to the hooter, until the plunger 120 is operated. The operation of the plunger 120 causes an increase in pressure in the pipe 121 and this results in the deformation of the diaphragm 105 and the operation of the plunger 106 which impinges against the valve 107 and returns it to its unoperated position.

The operation of the plunger 120 is only effective if the speed of the train has been reduced to a certain predetermined value (for instance 25 miles an hour) as the pipe 121 is connected to a speed controller S of the type already described. If the speed of the train is greater than the predetermined value the valve 122 of the speed controller opens and connects the pipe 121 to atmosphere so that the operation of the plunger 120 will be without effect. If, however, the operation of the plunger is effective and the valve 107 is restored, the train pipe 114 will be disconnected from the atmosphere via the hooter 104 and the partial brake application will be removed and the hooter will stop sounding.

When the locomotive passes a home signal such as shown in Fig. 1 and this signal is at "clear" the track device C, as already described, will have no effect on the receiver R. If, however, this signal is at "danger", the device C will be effective to operate the armature 102, thus causing the operation of the lift valve 112. At a home signal there is no separate track device to effect the automatic restoration of the armature 2, and therefore, the lift valve 112 will remain operated and a full brake application will occur owing to the connection of the train pipe to atmosphere at the port 115.

The lifting of the valve 107 will cause the hooter 104 to sound but this will stop almost immediately as the direct connection between the train pipe 114 and atmosphere at the port 115 is large compared with the connection between the train pipe and atmosphere via the hooter 104. Instead therefore, of the continuous operation of the hooter and a partial brake application such as occurs at a distant signal at "danger", there will be a short sharp operation of the hooter accompanied by a full brake application. This full brake application can only be released when the driver operates the release plunger 103 which plunger can, if desired, be located at a point on the locomotive which is only accessible to the driver when the train is at a standstill. The depression of the release plunger 103 causes the operation of the armature restoring device 101 which resets the armature and closes the slide valve 109.

The chamber below the diaphragm 111 now gradually exhausts through the restricted orifice 125 which connects with the vacuum reservoir via the pipe 127 and the lift valve is restored to normal and disconnects the train pipe from the port 115. The driver will also have to operate his plunger 120 to effect the restoration of the slide valve 107 or else he will not be able to effect a complete release of the brakes, and this restoration of the valve 107 can only occur if the speed of the train is reduced to below the predetermined value.

When the locomotive passes a combined home and distant signal, such as shown in Fig. 3, one or the other of the two controls can be effective depending upon the position of the semaphore arms. If both home and distant signals are at "clear" neither of the devices B and C will have any effect on the receiver, but if the home signal is at "clear" and the distant signal is at "danger", the electromagnet B will be energized and, therefore, the effect will be that of a distant signal at "danger", i. e. a continuous blast on the hooter accompanied by a partial application of the brakes. These will continue until the speed of the train is reduced to below 25 miles an hour and the plunger 120 is operated.

If, however, both home and distant signals are at "danger", the electromagnet B will be de-energized and the effect on the locomotive will be such as occurs when a home signal at "danger" is passed, i. e., a short blast on the hooter accompanied by a full brake application. This full brake application will continue until the release plunger 103 is operated and the train will only be free to continue unhindered when both the release plunger 103 and the plunger 120 have been operated.

The location effect which is caused by track apparatus, such as is shown in Fig. 5 will consist of a continuous blast on the hooter accompanied by a partial brake application and this will continue until the speed is reduced to below the predetermined value and the plunger 120 is operated.

What I claim is:

1. A train control and/or cab signalling system in which a valve located on the locomotive is adapted when operated by magnets located along the track to cause one kind of brake application to be initiated and to effect the operation of another valve which however does not become effective to cause a different kind of brake application to be initiated until the first valve has been restored.

2. A train control and/or cab signalling system in which a valve located on the locomotive and arranged when operated by magnets located along the track to effect the operation of a second valve is adapted to initiate a brake application if it is not restored subsequently by further magnets located along the track while if it is restored it allows the operated second valve to become effective to initiate a different kind of brake application.

3. A train control and/or cab signalling system as claimed in claim 1, in which the first valve if operated and restored automatically allows the second valve to control a distinctive audible signal while if operated and not restored automatically it prevents this audible signal from becoming effective and causes a different audible signal to be given instead.

4. A train control and/or cab signalling system as claimed in claim 2 in which the first valve is adapted to be restored when a slide valve controlled directly by the armature of the receiver relay is closed either automatically due to the receiver relay being influenced by magnets located along the track or manually due to a special operation being performed by the driver.

5. A train control and/or cab signalling system as claimed in claim 2, in which when a brake application has been initiated by the first valve this is adapted to be removed by the operation of a plunger irrespective of the speed at which the train is travelling, an element which must be operated however to restore the second valve before the train can proceed unhindered, and means for disabling the effectiveness of the operation of said element until the speed of the train is below a certain predetermined limiting value.

ALFRED ERNEST HUDD.